Dec. 30, 1952          L. E. WOOD ET AL          2,623,388
PORTABLE DEVICE FOR MEASURING AND INDICATING
THE DIRECTION AND VELOCITY OF WIND
Filed Sept. 2, 1949          4 Sheets-Sheet 2

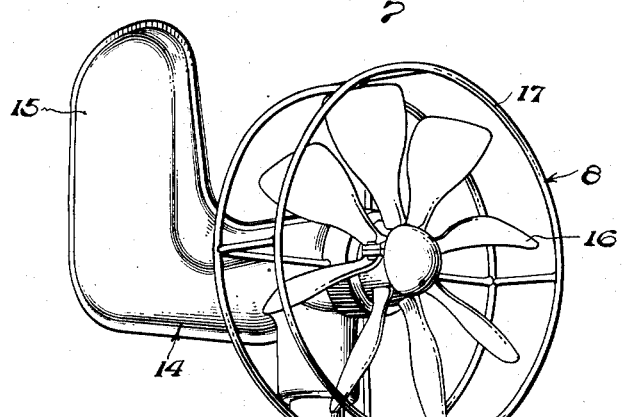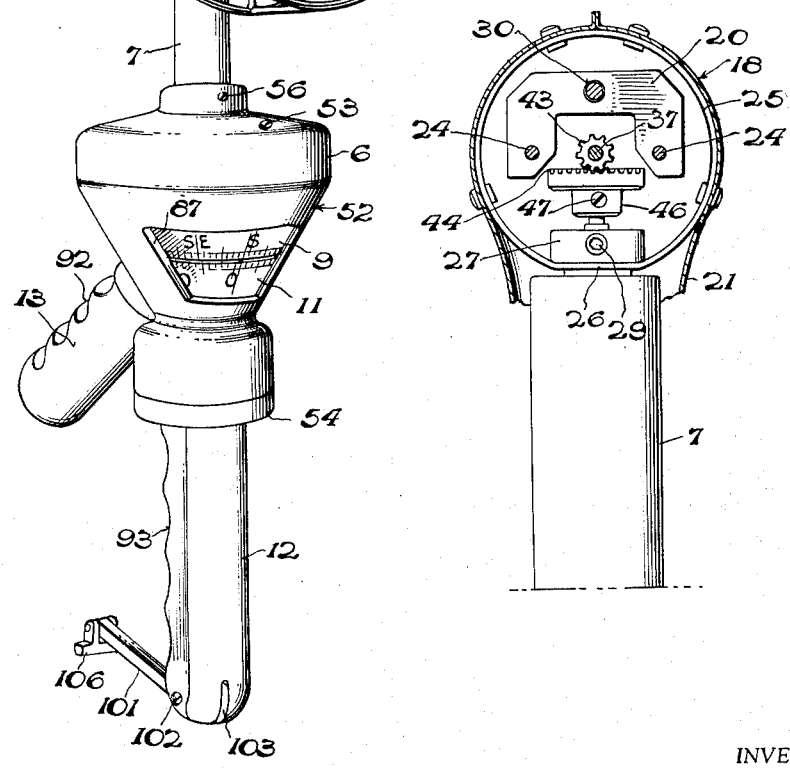

INVENTORS
Louvan E. Wood
L. Heath Vining, Jr.

BY Robert F. Peck
ATTORNEY

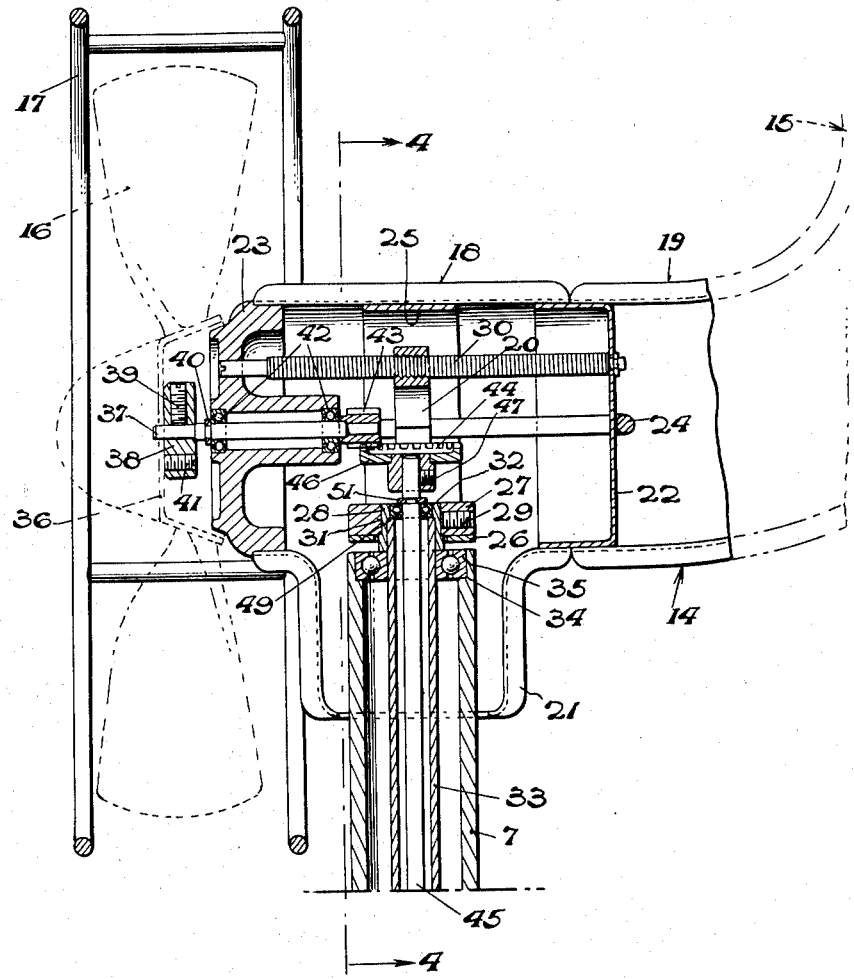

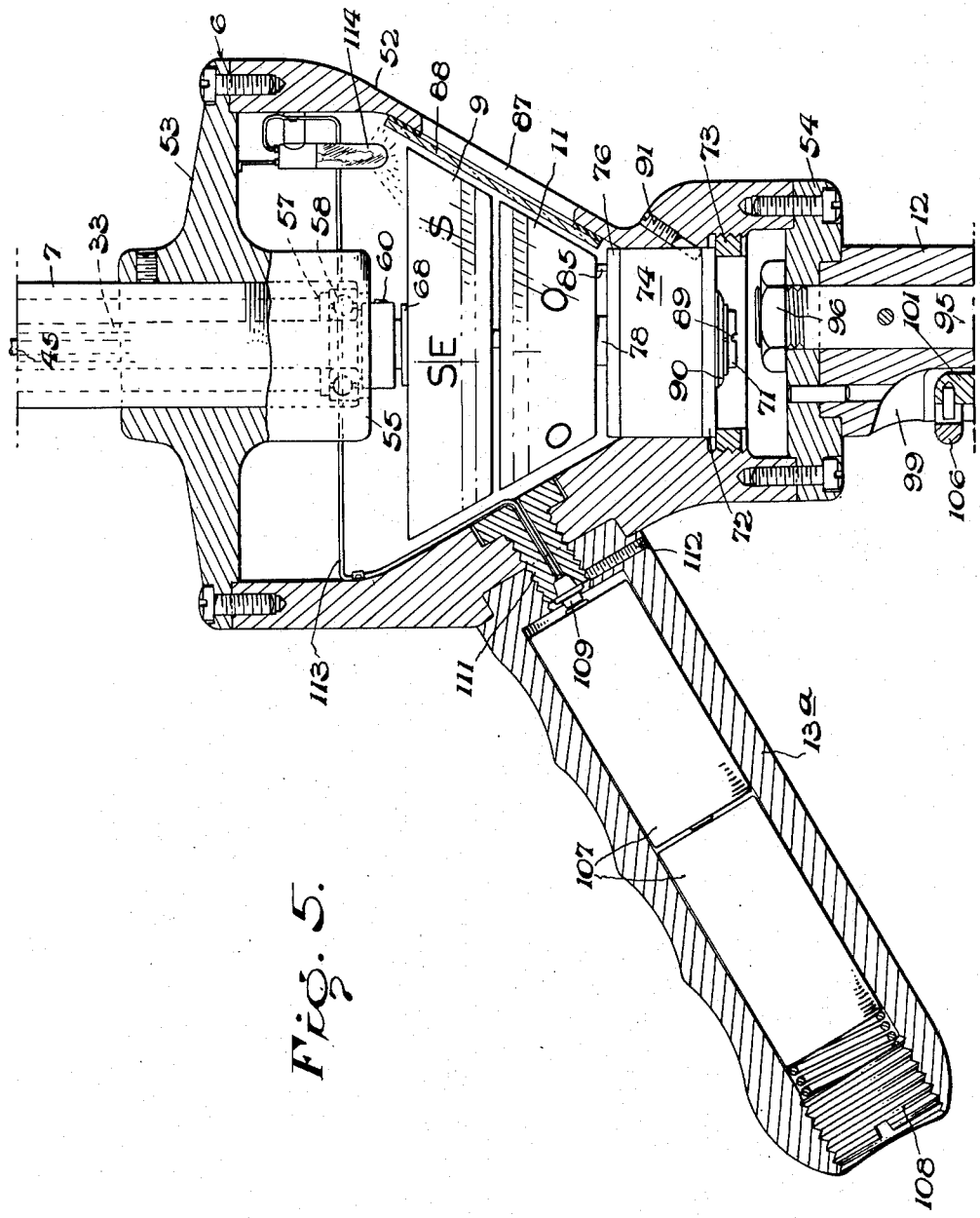

Patented Dec. 30, 1952

2,623,388

UNITED STATES PATENT OFFICE 2,623,388

PORTABLE DEVICE FOR MEASURING AND INDICATING THE DIRECTION AND VELOCITY OF WIND

Louvan E. Wood, Glen Arm, and L. Heath Vining, Jr., Baltimore, Md., assignors to Bendix Aviation Corporation, Baltimore, Md., a corporation of Delaware Application September 2, 1949, Serial No. 113,792

6 Claims. (Cl. 73—189)

1

This invention relates generally to improvements in devices for measuring and indicating the direction and velocity of wind and is directed primarily to devices of the general type mentioned above, adapted to be held in the hands of an observer.

In the design of portable wind measuring equipment, there are a number of factors which must be considered so that a successful design can be achieved. For example, the over-all weight of the instrument must be held to a minimum to permit ease of handling and, of course, the instrument should be compact, to further facilitate ease of handling, and of a rugged construction to withstand injury during handling. The device must be constructed so that the instrument can be conveniently and comfortably held in the hands of an observer in such a position that the wind responsive units have a good exposure to the wind and the indicating dials are properly located for ease of reading. Furthermore, there must be simple and positive means provided for orienting the instrument so that a reference may be established for determining wind direction.

All of the above factors have been carefully considered and the invention described herein represents a novel, useful and practical embodiment of the critical design factors mentioned above.

The portable wind measuring device disclosed herein is intended to give precise indications of wind conditions and the device has been so designed that the instantaneous conditions of wind can be easily noted by one using the device.

It is an object of this invention to provide a portable device for measuring and indicating wind conditions, that is light in weight, compact in size, of a rugged construction, having precise accuracy and constructed and arranged to promote easy and convenient handling and use.

It is another object of the invention to provide in a portable device for measuring wind conditions an arrangement whereby the wind sensing units are adapted to be positioned above the head of the one using the instrument so that good exposure to wind conditions is achieved.

It is another object of the invention to provide in an instrument of the type described, an unusual and novel arrangement of the indicating dials whereby the instantaneous conditions of wind direction and wind flow can be readily observed by one using the instrument.

Other objects and advantages will be apparent upon inspection of the accompanying drawings

2 when taken in conjunction with the detailed description to follow.

In the drawings:

Fig. 1 illustrates, in perspective, the over-all appearance of a device made in accordance with the teachings of the invention.

Fig. 3 is another view, in section, showing the details of the upper portion of the instrument shown in Fig. 1 and, for convenience, referred to as the transmitter assembly.

Fig. 4 is a view, in elevation, taken along the lines 4—4 in Fig. 3.

Fig. 5 is a view, partly in section and partly in elevation, showing the arrangement illustrated in Fig. 2, so modified as to provide for illumination of the instrument.

Figure 2:
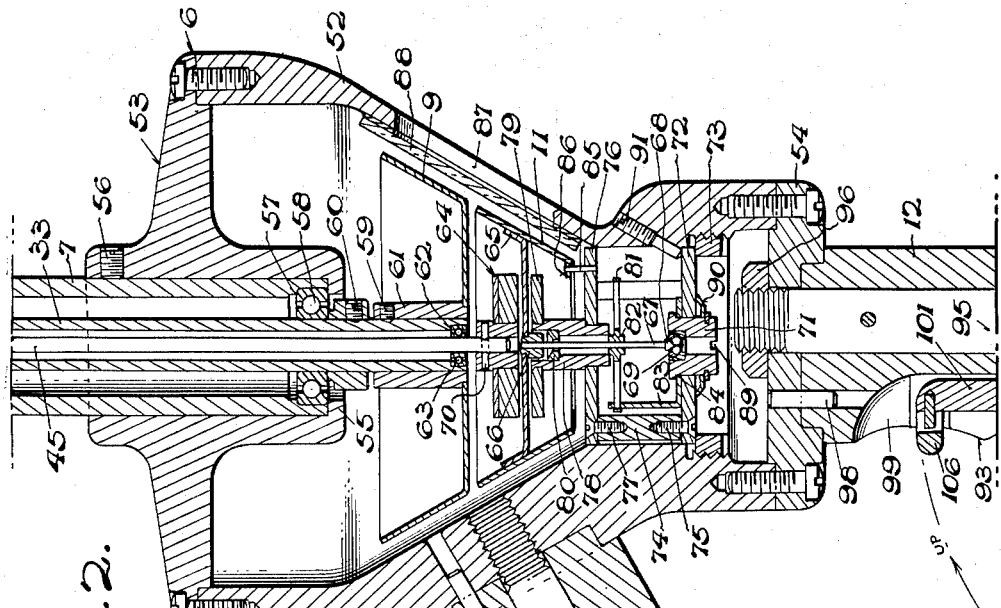
Fig. 2 is a sectional view in elevation of the lower portion of the instrument shown in Fig. 1.
Figure 2A:
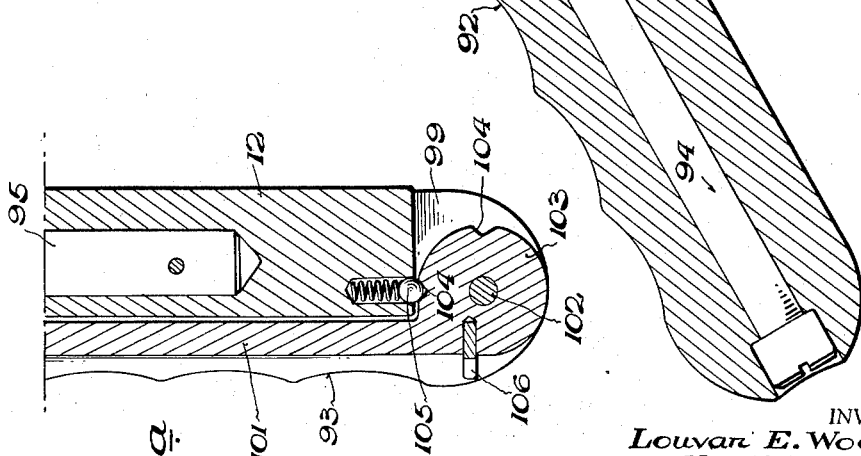
Fig. 2(a) is a continuation of the sectional view shown in Fig. 2 and illustrates the manner of construction of the bottom portion of the handle shown in Fig. 1.

Referring now to Fig. 1, we see an over-all view of a portable device for measuring and indicating the direction and velocity of wind, and comprising an indicator housing 6 having a vertical post 7 affixed to its top surface, on which is mounted for rotation the transmitter assembly 8. Mounted within the housing 6 are a pair of indicating dials 9 and 11 for showing the direction of the wind and the velocity of wind, respectively. The dial 11 can be provided with a scale to indicate the velocity in any conventional manner, such as miles per hour or knots per hour. The direction dial 9 is provided with the usual directional markings and the scale is arranged to show the wind direction through the full range of 360°. Also affixed to the housing 6 are a pair of handles 12 and 13. These handles are provided to permit the device to be conveniently and easily held in the hands of an observer.

The transmitter assembly 8 comprises a streamlined tubular body 14 having a vane 15 at one end and a multi-blade propeller-type rotor 16 at its other end. A cage 17 surrounds the rotor 16 and serves to protect the users of the device from possible injury that could be caused by rotation of the rotor 16. The body 14 may be made of a light weight material such as aluminum and is streamlined to offer a minimum resistance to the flow of wind. The vane 15 extends to a sufficient height so that the air from the slip stream of the rotor 16 does not materially influence the position of the vane 15, thus insuring accurate positioning of the transmitter assembly for the determination of wind direction. The vane 15 not only serves as a means of positioning, but helps to hold the transmitter assembly 8 in a position facing the wind so that the rotor 16 at all times will be exposed to the wind flow.

By means of a suitable mechanism to be described below, rotation of the body 14 under the influence of the vane 15, which responds to wind direction, will serve to rotate the dial 9 to give an indication of wind direction, and rotation of the propeller-type rotor 16, which rotates in response to wind velocity, will serve to rotate the dial 11 and give an indication of wind velocity.

The manner in which the rotation of the body 14 and the propeller-type rotor 16 causes rotation of the dials 9 and 11, respectively, will now be described, in connection with Figs. 2 and 3 of the drawings annexed hereto.

Referring first to Fig. 3, the body 14 is made in two parts: a front section 18 and a rear section 19, the front section 18 having a shroud 21 extending from its bottom and surrounding the upper extremity of the vertical post 7. The front section 18 carries the propeller-type rotor 16 and the rear section carries the vane 15. The sections 18 and 19 have a substantially circular cross-section configuration and the two sections are joined together in the following manner: the forward end of section 19 has cap member 22 suitably secured to its inner periphery in any conventional manner, as by brazing or welding; the open end of cap 22 slidably engages the inner periphery of section 18 at its rearward end. Also slidably engaging the inner periphery of section 18 at its forward end is a cap member 23. The cap members 22 and 23 have suitably aligned apertures (not shown) to provide for the insertion of a U-bolt 24 therein. The forward ends of the U-bolt 24 are threaded to receive nuts (not shown), the nuts engaging suitable shoulders surrounding the apertures in cap 23. Thus, with the two sections 18 and 19 assembled with their respective caps and U-bolt in place, the nuts on the ends of the U-bolt 24 can be suitably tightened so that the sections 18 and 19 are secured together.

To provide a means of balancing the transmitter assembly 8, there is a balancing member 20 which slidably engages the legs of U-bolt 24. A threaded rod 30 is mounted for rotation in the caps 22 and 23 and threadably engages the balancing member 20. A slot is provided in the forward extremity of rod 30 so that a screwdriver may be used to turn the rod 30 and thus move the balancing member 20 until proper balance is obtained.

Surrounding the inner periphery of the section 18 and suitably secured thereto as by welding or brazing is a ring-like member 25 having a flat bottom surface 26 (as best shown in Fig. 4). Affixed to the upper surface of the flat portion 26 of ring 25 is a member 27. The flat portion 26 and the member 27 are suitably apertured to receive a collar 28, the collar 28 extending loosely through the aperture in the flat portion 26 and snugly engaging the aperture provided by member 27. A screw 29 is provided to lock the collar 28 to the member 27. The inner surface of the collar 28 has an annular shoulder 31 which provides an abutment for the upper extremity 32 of a tubular shaft 33. The shaft 33 and the collar 28 are rigidly secured to one another, as by brazing or welding. The post 7 has an annular shoulder 34 provided at its upper extremity for snugly receiving therein a bearing 35. The lower extremity of collar 28 rests upon the upper surface of the inner race of the bearing 35, thus forming a seat on which the body 14 is supported and, with a suitably pressed fit between the bearing and the shaft 33, it is evident that the body 14 is free to rotate about the upper extremity of post 7, and if the body 14 rotates, the shaft 33 will also rotate. Therefore, the shaft 33 rotates in response to changes in wind direction.

Propeller-type rotor 16 is mounted on a hub 36 which, in turn, is rigidly secured to shaft 37 by means of collar 38 and screws 39 and 41. The shaft 37 is mounted for rotation in the cap 23 by means of bearings 42 and the end of the shaft 37 remote from the rotor carries a pinion 43. The pinion 43 has a shoulder which cooperates with collar 40, and bearings 42, to prevent axial movement of shaft 37. The pinion 43 engages a crown gear 44 which, in turn, is rigidly secured to shaft 45 by means of collar 46 and screw 47. The collar 46 may be secured to the crown gear 44 in any conventional way, such as brazing or welding. Resting on the upper extremity of shaft 33 and pressed into the collar 28 is a bearing 49 which serves as a journal for the shaft 45. A small collar 51 surrounding a cutout portion on shaft 45 rests on the upper surface of bearing 49 and acts as a thrust member for the shaft and gear assembly.

From the above, it is evident that rotation of the rotor 16 causes the shaft 37 to rotate which, in turn, causes the associated pinion 43 to rotate, the pinion 43, in turn, causing the crown gear 44 to rotate, which, in turn, causes the shaft 45 to rotate. Thus the shaft 45 will rotate in response to rotation of rotor 16 and the rotational movement of shaft 45 serves to transmit the conditions of wind velocity.

The shafts 33 and 45 pass down through the post 7 and into the interior portion of the indicator housing 6 and serve to rotate the dials 9 and 11 in a manner to be described below.

Referring now to Fig. 2, it is seen that the indicator housing 6 comprises a main body portion 52, a top cap 53 and a bottom cap 54. The top cap 53 serves to enclose the top side of the main body portion 52 and also serves as the supporting means for vertical post 7. Thus, the cap 53 is provided with a suitable aperture terminating at the lower extremity of cap 53 in a shoulder 55. The post 7 is supported on the shoulder 55, and held rigid, with respect to cap 53, by means of a screw 56. The lower extremity of post 7 is provided with an annular shoulder 57 which serves as a limit for a bearing 58 which is pressed into the lower extremity of post 7. Bearing 58 also rests on the shoulder 55. The shaft 33 extends down through post 7 through the aperture in cap 53 and terminates at a point below the aforesaid shoulder 55. The bearing 58 serves as a journal permitting rotation of the shaft 33. A collar and set-screw assembly 60 in cooperation with bearing 58, serve to prevent axial movement of shaft 33.

Affixed to the lower extremity of shaft 33 by means of screw 59 is a collar 61. The collar 61 has secured, at its lower extremity, a dish-shaped member which constitutes the dial 9.

A shoulder 62 in the lower extremity of shaft 33 serves as a limiting surface against which a bearing 63 rests, the shaft 45 extending down through the shaft 33 and being journaled for rotation at its lower extremity by means of the bearing 63. Suitably secured, by set-screws 70, to the lower extremity of shaft 45, is a temperature-compensated magnetic assembly 64. In close proximity to the magnetic assembly 64 is a small dish-shaped member 65 to which is secured a larger dish-shaped member having an open top and bottom and constituting the dial 11. The small dish-shaped member 65 may be made of aluminum, brass, or other suitable material, and has a hub 66 secured centrally thereof. The hub 66 has rigidly secured thereto a shaft 67, the shaft 67 being tapered to form a pin 68 at its lower extremity, the pin 68 cooperating with the bearing 69 to form a combination thrust and rotating bearing for the shaft 67. The bearing 69 is supported by a stud 71 which, in turn, is affixed to a plate 72, the plate 72 resting on the upper surface of a collar 73 which threadably engages the inner periphery of the lower extremity of body portion 52. From the above, it is evident that the stud 71 is fixed in position with respect to the indicator housing 6 and thus serves as a fixed support for the rotating shaft 67. The plate 72 has a vertical member 74 suitably secured thereto by means of screw 75 and there is another plate 76 suitably secured to the surface of member 74 by means of screw 77. The plate 76 has an aperture located centrally thereof through which a collar 78 protrudes. The collar 78 has a shoulder at its lower extremity which rests on the upper surface of plate 76. The collar 78 has secured to it a piece of cold rolled steel 79. A bearing 80 is supported on a shoulder in collar 78 and cooperates with bearing 69 to permit rotation of the shaft 67. Thus the hub 66, and its associated shaft, are free to rotate within the collar 78.

The combination of the permanent magnetic assembly 64 and the piece of cold rolled steel 79 operates as a magnetic drag tachometer whereby rotation of the magnetic assembly 64 creates a rotating magnetic field. The aluminum member 65 tends to resist the rotation of the magnetic field and this tendency manifests itself as a torque exerted on the member 65, tending to rotate same.

The magnetic drag tachometer assembly, heretofore described, ordinarily requires the use of a spring to restrain the motion of the member 65. Such a spring is shown at 81 and is of a spiral configuration, one end of which is affixed to hub 82, which is rigidly secured to shaft 67, the other end being affixed to an upright member 83 which is rigidly secured to the stud 71 by means of a flanged-shoulder 84.

Therefore, rotation of shaft 45 will cause the member 65 to move and the movement of member 65 will be proportional to the speed of rotation of shaft 45. The indicator dial 11, which is carried by member 65, will move a corresponding amount. Positioned on the plate 76 is an upright pin 85 which cooperates with a flanged-out section 86 of the lower extremity of dial 11. This pin and flange arrangement serves to provide a zero stop for the dial 11. To adjust the zero setting, it is noted that the collar 78 has a slot 89 in its lower extremity. The collar 78 may be rotated with respect to plate 72, the spring washer 90 being provided to normally prevent any rotation of collar 78. If a screw-driver be inserted into slot 89, the collar 78 can be rotated, thus causing the member 83 to rotate which serves to turn the shaft 67 through the agency of the spring 81. In this manner, the zero position of the dial may be adjusted.

The threaded collar 73, previously referred to as a means of support for the plate 72, in combination with clamping screw 91, also serves as a calibration adjusting means for the speed indicating assembly. That is, by rotation of the collar 73, in either direction, the plate 72 can be moved axially with respect to the indicator housing 6, and this axial movement of the plate 72 causes the assembly comprising plate 72, member 74, plate 76 and collar 78 to move axially. Axial movement of the aforementioned assembly causes axial movement of the shaft assembly comprising shaft 67, hub 66, and member 65. This last axial motion will change the air gap between the magnetic assembly 64 and steel piece 79, thus effecting calibration.

From the above, it is evident that the dials 9 and 11 will rotate in response to changes in wind speed and wind direction. An opening 87 is provided in the indicator housing 7 so that the position of the dials 9 and 11 can be observed. A window 88 covers the opening at 87, and the window 88 can be provided with a suitable reference marking to cooperate with graduations provided in the dial faces. It is to be noted that the dial faces of dials 9 and 11 lie in a common surface inclined upwardly and outwardly with respect to the vertical axis of indicator housing 6, thereby permitting the position of the dials to be readily observed from a point below the dials.

As mentioned above, a pair of handles 12 and 13 are affixed to the indicator housing 6. The handles 12 and 13 are provided with gripping surfaces 92 and 93, both of the handles being hollow for receiving threaded bolts 94 and 95, respectively. The bolt 94 coacts with a suitable threaded aperture in the side of the main body portion 52 opposite the opening 87. The bolt 95 extends through an aperture in bottom cap 54 and is clamped securely thereto by means of nut 96. Dowel pins 97 and 98 are provided so that the handles 89 and 91 can be properly located with respect to the indicator housing 6.

The handle 91, which extends vertically downward from the indicator housing 6, has a slotted recessed portion 99 for receiving a sighting member 101, pivotally mounted on the handle 12 by means of a pivot shaft 102. Member 101 has a hub section 103 which is substantially cylindrical in cross-sectional configuration and has a pair of V-notches 104 disposed 90° apart on its peripheral surface. The notches 104 cooperate with the spring pressed ball 105 to retain the sighting member 101 in either the withdrawn position within the recess 99 or the extended position whereby the member 101 is located at right angles to the vertical axis of the indicator housing 6. A pair of sighting elements 106 are provided on the sighting member 101 for a purpose to be hereafter described.

With the above detailed description of the manner of operation of the invention in mind, the manner of using the portable device becomes obvious. Thus, assuming that the device is properly calibrated, if one desires to obtain an instantaneous value of wind direction and wind speed, it is only necessary to withdraw the sighting member 101 from its normal recessed position, grasp the handle 12 in one hand and the handle 13 in the other and raise the device until the sighting member 101 is at the eye-level of the observer. By using this sighting member to locate a fixed point, the transmitter assembly will then position itself into the wind and the dial 9 will assume a position in accordance with the direction of the wind, with respect to the fixed reference axis, and the dial 11 will assume a position in accordance with wind velocity. It is to be noted that when the observer has lined up his reference axis, it is only necessary for him to shift his line of sight upwardly to easily note the position of the dials 9 and 11. The angle of inclination of dials 9 and 11 is such that the dial surfaces are substantially perpendicular to the observer's line of sight. By proper selection of dimensions of the handle 12, the indicator housing 6 and the vertical post 7, the transmitter assembly 8 will be positioned at such a height above the sighting member 101 that when the observer uses the instrument in the manner described above, the transmitter assembly 8 will be positioned above his head for unobstructed exposure to the wind.

Referring now to Fig. 5, we see a modified version of the device described above, wherein means are provided for illuminating the dials 9 and 11 so that the device is adapted for use in the darkness. By means of a slightly different handle to replace the handle 13, the device can be suitably illuminated without further change of any parts. Thus, in Fig. 5, the handle 13a is hollowed out to permit the insertion of batteries 107. A conventional plug and spring assembly 108 may be used to urge the batteries 107 against the contact 109, which is mounted in and suitably insulated from screw 111, affixed in the main body portion 52 of indicator housing 6. The handle 13a suitably engages the screw 111 and is secured in place by means of a set-screw 112. A lead 113 has one end connected to the contact 109 and is suitably clamped to the inner surface of main body 52, the other end of the lead 113 being connected to one terminal of a light bulb 114. The other terminal of the bulb 114 is connected to the housing 6, which constitutes a ground and if the bottom terminals of the batteries 107 are connected to the housing or ground, a circuit is provided whereby the bulb 114 is energized by the batteries 107. A suitable switch could be inserted in the circuit so that the light bulb could be selectively turned on or off. If the main body of the dial faces were made of a light-transmitting material and the graduations consisted of an opaque material coated or placed thereon, it is obvious that the dials would be suitably illuminated by the light bulb 114 to permit use of the device in the darkness. Various schemes could be devised for providing illumination of the dial faces. All of the schemes, however, would ordinarily avail of a light source positioned within the interior of the indicator housing 6 and energized by a source of electrical energy carried by the indicator housing 6.

What is claimed and desired to be secured by United States Letters Patents is:

1. In a portable device for measuring and indicating the direction and velocity of wind and adapted to be held in the hands of an observer, the combination of: an indicator housing; a pair of indicating dials independently mounted for rotation in said housing, each of said dials having dial faces lying in a common surface inclined upwardly and outwardly from the vertical axis of said housing; there being an opening in said housing cooperating with said dials to permit observation of the position of said dials; a pair of handles affixed to said housing to permit said device to be held in the hands of an observer, one of said handles being affixed to the bottom of said housing and extending vertically downward from said housing, the other of said handles being affixed to said housing at a point opposite to said opening and at an angle to the axis of said housing; and means mounted on said housing for rotating said dials in response to the direction of the wind and the velocity of wind flow.

2. In a portable device for measuring and indicating the direction and velocity of wind and adapted to be held in the hands of an observer, the combination of: a housing; a pair of indicating dials mounted within said housing for rotation about the vertical axis of said housing, each of said dials having dial faces lying in a common surface inclined upwardly and outwardly from said vertical axis; there being an opening in said housing cooperating with said dials; means supported by said housing and positioned above said housing for rotating one of said dials in response to wind direction and for rotating the other of said dials in response to the velocity of wind flow; means affixed to said housing for permitting said device to be held in the hands of an observer; a sighting member affixed to said last-named means whereby said device may be properly oriented for determining wind direction, said sighting member comprising a pivotally mounted member having a pair of cooperating sighting elements thereon and being adapted for positioning perpendicular to the vertical axis of said device at a point below said dial faces, whereby said device may be held in the hands of an observer with the sighting member at eye-level so that the position of said dial faces can be easily detected by an upward shift in the observer's line of sight.

3. In a portable device for measuring and indicating the direction and velocity of wind and adapted to be held in the hands of an observer, the combination of: a housing; a pair of indicating dials mounted within said housing for rotation about the vertical axis of said housing; each of said dials having dial faces lying in a common surface inclined upwardly and outwardly from said vertical axis; there being an opening in said housing cooperating with said dials; means supported by said housing and positioned above said housing for rotating one of said dials in response to wind direction and for rotating the other of said dials in response to the velocity of wind flow; a pair of handles affixed to said housing for permitting said device to be held in the hands of an observer, one of said handles extending vertically downward from said housing; there being a recess in said vertical handle; a member normally lying within the confines of said recess and pivotally mounted on said vertical handle; said member being adapted for withdrawal from said recess to a position perpendicular to the vertical axis of said housing; sighting means carried by said member to enable an observer to properly orient said device for determining wind direction; said device being adapted to be held in the hands of an observer with the sighting means at eye-level so that the position of the indicating dials can be readily detected by an upward shift in the observer's line of sight.

4. In a portable device for measuring and indicating the direction and velocity of wind and adapted to be held in the hands of an observer, the combination of: a housing; a pair of handles affixed to said housing, one of said handles extending vertically downward from the bottom of said housing; a support affixed to the top of said housing and extending vertically upward from said housing; a member mounted for rotation on said vertical support; means for rotating said member in response to wind direction, rotating means carried by said member and rotating in response to the velocity of wind flow; a pair of indicating dials mounted for rotation within said housing; each of said dials having dial faces lying in a common surface inclined upwardly and outwardly with respect to the vertical axis of said housing whereby the position of said dials can be observed from a point below said dial faces; there being an opening in said housing cooperating with said dials; means for rotating one of said dials in response to the rotation of said member; means for rotating the other of said dials in response to rotation of said rotating means; the said handle, housing, and vertical support being so dimensioned that the said member, the said means for rotating said member, and the said rotating means carried by said member, will be above the head of an observer holding said device in such a position that the lower extremity of said handle is substantially at the eye-level of the observer.

5. In a portable device for measuring and indicating the direction and velocity of wind and adapted to be held in the hands of an observer, the combination of: a housing; a pair of handles affixed to said housing, one of said handles extending vertically downward from the bottom of said housing; a support affixed to the top of said housing and extending vertically upward from said housing; a body mounted for rotation on said vertical support; a vane carried by said body for rotating said body in response to wind direction; a propeller-type rotor mounted for rotation on said body and rotating in response to velocity of wind flow; a pair of indicating dials mounted for rotation within said housing, each of said dials having dial faces lying in a common surface inclined upwardly and outwardly with respect to the vertical axis of said housing whereby the position of said dials can be observed from a point below said dial faces; there being an opening in said housing cooperating with said dials whereby the position of said dials may be observed; means for rotating one of said dials in response to the rotation of said body; means for rotating the other of said dials in response to rotation of said rotor; the said handle, housing, and vertical support being so dimensioned that the said body, vane and rotor will be above the head of an observer holding said device in such a position that the lower extremity of said handle is substantially at the eye-level of the observer.

6. The combination defined in claim 5 wherein the said vertical handle has a sighting member affixed thereto, said sighting member having a pair of cooperating sighting elements thereon and being adapted to extend outwardly from the lower extremity of said vertical handle at right angles to said housing vertical axis whereby said device can be properly oriented to determine wind direction.

LOUVAN E. WOOD.
L. HEATH VINING, JR.

REFERENCES CITED

The following references are of record in the file of this patent:

UNITED STATES PATENTS

| Number | Name | Date |
|---|---|---|
| 1,543,198 | Walters | June 23, 1925 |
| 1,707,473 | Goldberg | Apr. 2, 1929 |
| 2,214,392 | Whipple | Sept. 10, 1940 |
| 2,283,994 | Hopkins | May 26, 1942 |

FOREIGN PATENTS

| Number | Country | Date |
|---|---|---|
| 418,720 | France | Oct. 7, 1910 |
| 383,373 | Germany | Oct. 12, 1923 |
| 736,382 | France | Nov. 23, 1932 |
| 365,553 | Italy | Dec. 7, 1938 |